United States Patent [19]

Smith

[11] 4,105,643

[45] Aug. 8, 1978

[54] PREPARATION OF CARBODIIMIDE IN PRESENCE OF PHOSPHOLENE CATALYSTS

[75] Inventor: Curtis P. Smith, Cheshire, Conn.

[73] Assignee: The Upjohn Company, Kalamazoo, Mich.

[21] Appl. No.: 847,658

[22] Filed: Nov. 1, 1977

Related U.S. Application Data

[62] Division of Ser. No. 764,374, Jan. 31, 1977, Pat. No. 4,068,065.

[51] Int. Cl.$^2$ .......................... C08F 18/22; C08F 4/00
[52] U.S. Cl. .................................... 528/512; 526/27; 526/275; 528/69
[58] Field of Search ............... 260/77.5 AC, 77.5 AB; 526/275, 27

[56] References Cited

U.S. PATENT DOCUMENTS

| | | | |
|---|---|---|---|
| 3,767,708 | 10/1973 | Smith et al. | 260/77.5 AC |
| 3,855,186 | 12/1977 | Moedritizer | 526/275 |
| 3,855,353 | 12/1977 | Moedritizer | 526/275 |
| 4,067,820 | 1/1978 | Wagner et al. | 260/77.5 AB |

*Primary Examiner*—William F. Hamrock
*Attorney, Agent, or Firm*—Denis A. Firth; John Kekich

[57] ABSTRACT

Homopolymers of the diacrylates, dimethacrylates, di(2-haloacrylates) and di(2-cyanoacrylates) of 1-dialkanolaminophospholene-1-oxides and the copolymers of the above esters with lower-alkyl acrylates, meth-acrylates, 2-chloroacrylates and 2-cyanoacrylates are described. These polymers are useful as catalysts in the conversion of organic isocyanates to the corresponding carbodiimides.

2 Claims, No Drawings

PREPARATION OF CARBODIIMIDE IN PRESENCE OF PHOSPHOLENE CATALYSTS

This is a division of application Ser. No. 764,374 filed Jan. 31, 1977, now U.S. Pat. No. 4,068,065.

BACKGROUND OF THE INVENTION

1. Field of the Invention

This invention relates to novel copolymers and is more particularly concerned with novel copolymers of acrylates and with methods for their preparation and their use as carbodiimide catalysts.

2. Description of the Prior Art

It is known that certain phospholene oxides are catalysts for the conversion of isocyanates to carbodiimides; see U.S. Pat. No. 2,853,473. It has also recently been disclosed (see German Offenlegenschrift No. 2,504,334; published after the present invention was made) that certain phospholene-phosphonic acid salts of amino-modified polystyrenes can be employed as catalysts for the same reaction.

We have now found that certain copolymers of alkyl acrylates and the di-acrylates of 1-dialkanolaminophospholene-1-oxides are highly effective catalysts for the conversion of organic isocyanates to the corresponding carbodiimides and are possessed of marked advantages when employed for this purpose.

SUMMARY OF THE INVENTION

This invention comprises a polymer selected from the class consisting of (i) the homopolymers of a compound of the formula:

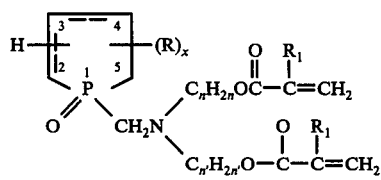 (I)

wherein the broken lines in the phospholene nucleus indicate a double bond located between the carbon atom at position 3 and one of the carbon atoms at positions 2 and 4, the H atom is attached to whichever carbon atom at positions 2 and 4 is not part of said double bond, R is selected from the group consisting of halogen, lower-alkoxy, phenoxy, hydrocarbyl from 1 to 6 carbon atoms, inclusive, and halohydrocarbyl from 1 to 6 carbon atoms, inclusive, $x$ is 0 to 3, $C_nH_{2n}$ and $C_nH_{2n'}$ are each independently alkylene from 2 to 6 carbon atoms, inclusive, and $R_1$ is selected from the class consisting of hydrogen, methyl, halo, and cyano, and (ii) the copolymers of the compounds of formula (I) with at least one monomer selected from the class consisting of lower-alkyl esters of acrylic, methacrylic, 2-cyanoacrylic and 2-haloacrylic acids.

The term "lower-alkyl" means alkyl from 1 to 6 carbon atoms, inclusive, such as methyl, ethyl, propyl, butyl, pentyl, hexyl, and isomeric forms thereof.

The term "lower-alkoxy" means alkoxy from 1 to 6 carbon atoms, inclusive, such as methoxy, ethoxy, propoxy, butoxy, pentyloxy, hexyloxy, and isomeric forms thereof. The term "hydrocarbyl" means the monovalent radical obtained by removing one hydrogen atom from the parent hydrocarbon having the stated number of carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like, including isomeric forms thereof; and cycloalkenyl such as cyclopentenyl, cyclohexenyl, cycloheptenyl, cyclooctenyl, and the like, including isomeric forms thereof.

The term "halohydrocarbyl" means hydrocarbyl of the stated carbon atom content having one or more halo substituents, i.e. chloro, bromo, iodo and fluoro.

The term "alkylene from 2 to 6 carbon atoms" means the divalent radical obtained by removing 2 hydrogen atoms from an alkane having the stated carbon atom content and is inclusive of ethylene, 1,2-propylene, 1,3-propylene, 1,4-butylene, 2,3-dimethyl-1,4-butylene, and the like including isomeric forms thereof.

The invention also comprises a process for the conversion of organic isocyanates, in whole or in part, to the corresponding carbodiimides employing the above copolymers as catalyst.

DETAILED DESCRIPTION OF THE INVENTION

The polymers of the invention are obtained by polymerizing the compound of formula (I), alone or in admixture with one or more of the lower-alkyl esters of acrylic, methacrylic, cyanoacrylic or haloacrylic acids, using procedures well-known in the art for polymerizing acrylate monomers; see, for example, Encyclopedia of Polymer Science and Technology, Vol. 1, p. 246, et seq., Interscience, New York, 1964. Such methods include free radical initiation in homogeneous media or emulsion or suspension as well as thermal and photochemical polymerization, and are too well-known to need detailed recitation herein.

The phospholene derivatives of formula (I) which are employed as starting monomers in preparing the polymers of the invention, are readily prepared by esterifying the corresponding diols (II) using the appropriate acid halide of acrylic, methacrylic, 2-haloacrylic or 2-cyanoacrylic acid under conditions well-known in the art for esterifying alcohols. The diols (II) have the formula:

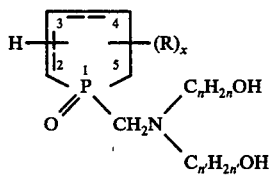

wherein the dotted lines, H, R, $x$ and $C_nH_{2n}$ and $C_nH_{2n'}$ have the significance hereinbefore defined. These diols are known in the art as are methods for their preparation: see U.S. Pat. No. 3,767,708.

In making the copolymers of the invention the proportions of monomers are so chosen that there is at least 10 percent by weight of the monomer of formula (I) in the starting mixture of monomers.

In a further aspect of the present invention there is provided an improved process for the preparation of organic carbodiimides by heating the corresponding organic isocyanate in the presence of a carbodiimide-forming catalyst, the improvement lying in the use as catalyst of a polymer or copolymer described above. The process can be applied to conversion of any organic isocyanate and it has the advantage over previously employed catalysts that the polymeric catalyst always remains in a phase separate from the isocyanate and the resulting carbodiimide, and can be readily separated from the latter at the end of the reaction. Further, the use of the polymeric catalysts is readily adaptable to a continuous type process in which the organic isocyanate to be treated, optionally as a solution in an appropriate organic solvent, is passed through a supported bed or column of catalyst. The hold up time in the column is adjusted so that complete conversion, or any desired degree of conversion, can be achieved in a single passage through the column.

Any of the known organic mono or polyisocyanates can be converted to the corresponding carbodiimide using the novel polymeric catalysts of the invention. Illustrative of such isocyanates are methyl, ethyl, isopropyl, butyl, hexyl, octyl, octadecyl, allyl, 2-pentyl, cyclopentyl, cyclohexyl, 1-cyclopentenyl, 2-cycloheptenyl, benzyl, phenethyl, 3-phenylpropyl, benzhydryl, 2-naphthylmethyl, naphthyl, phenyl, p-tolyl, o-tolyl, 3-nitrophenyl, 4-methoxyphenyl, 4-allyloxyphenyl, 3,4-xylyl, 2-chlorophenyl, decahydronaphthyl, trifluoromethyl, 2-chloroethyl and 3-nitropropyl monoisocyanates; 2,4-toluene, 2,6-toluene, hexamethylene, 4,4'-biphenylene, 3,3'-dimethoxybiphenylene-4,4'-diisocyanates, methylenebis-(phenyl isocyanate) and the like such as those listed in Siefkin Ann. 562, 122-135, 1949.

In carrying the conversion of the organic isocyanate to the corresponding carbodiimide, the organic isocyanate and the polymeric catalyst are brought together in the proportion of about 0.1 part by weight to about 10 parts by weight of catalyst per 100 parts of isocyanate. The reaction is advantageously carried out at elevated temperatures of the order of about 70° C to about 200° C. The progress of the reaction can be followed readily by measuring the evolution of carbon dioxide which is eliminated in the reaction. Cessation of evolution of the gas generally indicates completion of the reaction. The resulting carbodiimide is then readily separated from the catalyst. The separation is facilitated by carrying out the reaction in the presence of an organic solvent in which starting isocyanate and the resulting carbodiimide are soluble. At the end of the carbodiimide forming reaction it is merely necessary to filter the catalyst from the reaction product. The catalyst can be reused any number of times without losing activity.

The carbodiimides which are prepared in accordance with this aspect of the process of the invention are known compounds which are useful in preventing ageing and hydrolysis of elastomers; see, for example, U.S. Pat. Nos. 3,297,795 and 3,378,517.

The following examples describe the manner and process of making and using the invention and set forth the best mode contemplated by the inventors of carrying out the invention but are not to be construed as limiting.

EXAMPLE 1

A. Preparation of dimethacrylate of 1-diethanolaminomethyl-3-methyl-3-phospholene-1-oxide.

To a solution of 35.6 G. (0.153 mole) of 1-diethanolaminomethyl-3-methyl-3-phospholene-1-oxide (U.S. Pat. No. 3,767,708) and 31.8 g. (0.315 mole) of triethylamine in a mixture of 100 ml. of anhydrous benzene and 50 ml. of methylene chloride there was added slowly, with stirring, a solution of 31.98 g. (0.306 mole) of methacryloyl chloride in 25 ml. of anhydrous benzene. The reaction mixture was maintained under nitrogen throughout the reaction and cooling was applied, when necessary, to keep the reaction temperature below 25° C. The resulting product was stirred for 45 minutes after the addition of acid chloride was complete and was then filtered to remove triethylaminehydrochloride. The filtrate was decanted from an insoluble oil and evaporated to dryness to give 35.1 g. (62 percent theoretical yield) of the dimethacrylate of 1-diethanolaminomethyl-3-methyl-3-phospholene-1-oxide in the form of a brown oil.

B. Homopolymerization of the dimethacrylate.

A suspension of 5.7 g. of the dimethacrylate prepared as described above and 0.298 g. of dibenzoylperoxide in 50 ml. of water was heated under reflux for 1 hour before being cooled to room temperature. The solid which had separated was isolated by filtration, washed by trituration in acetone suspension and then filtered and dried in an oven. There was thus obtained 2.1 g. of a yellow, solid homopolymer characterized by the following recurring unit:

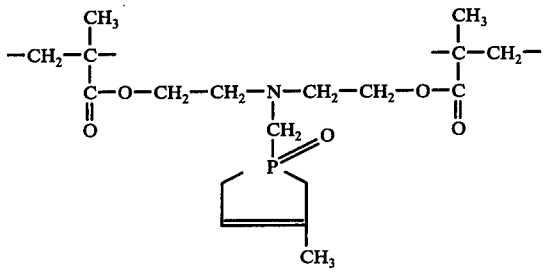

EXAMPLE 2

A suspension of 4.2 g. (0.0114 mole) of the dimethacrylate prepared as described in Example 1, part A, 7.3 g. (0.073 mole) of methyl methacrylate, and 0.412 g. of dibenzoylperoxide in 50 ml. of water was heated under reflux for 15 minutes and then allowed to cool to room temperature (circa 20° C). The solid which had separated as a slurry was isolated by filtration. The solid was suspended in acetone and the mixture was heated under reflux before being filtered and the solid washed on the filter with hot acetone and dried in vacuo. There was thus obtained 10.2 g. (88.7 percent theoretical yield) of a yellow solid copolymer of methyl methacrylate and the dimethacrylate of 1-diethanolaminomethyl-3-methyl-3-phospholene-1-oxide.

EXAMPLE 3

Using the procedure of Example 1, part A, but replacing the 1-diethanolaminomethyl-3-methyl-3-phospholene-1-oxide by 1-dipropanolaminomethyl-3-methyl-3-phospholene-1-oxide, 1-diethanolaminomethyl-3-methyl-2-phospholene-1-oxide, 1-diethanolaminomethyl-3-chloro-3-phospholene-1-oxide, 1-diethanolaminomethyl-2,3,4,5-tetrabromo-3-phospholene-1-oxide, 1-diethanolaminomethyl-3,4-dibutyl-3-phospholene-1-oxide, 1-diethanolaminomethyl-3-(4-chloro-4-methylpentyl)-3-phospholene-1-oxide, 1-diethanolaminomethyl2,3,5-triphenyl-3-phospholene1-oxide, 1-diethanolaminomethyl-2-o-chlorophenyl-5-phenyl-3-phospholene-1oxide, 1-diethanolaminomethyl-5-vinyl-3-phospholene-1-oxide, 1-diethanolaminomethyl-4-(4-methyl-3-pentenyl)-3-phospholene-1-oxide, 1-diethanolaminomethyl-5-phenoxy-3-phospholene-1-oxide, 1-diethanolaminomethyl-3-methoxy-3-phospholene-1-oxide, and 1-diethanolamino-2-isohexyloxy-3-phospholene-1-oxide, there are obtained the corresponding dimethacrylates. The latter are then homopolymerized using the procedure described in Example 1, part B, or copolymerized with methyl methacrylate using the procedure described in Example 2.

EXAMPLE 4

Using the procedure described in Example 2, but replacing the methyl methacrylate there used by hexyl methacrylate, methyl acrylate, ethyl acrylate, methyl 2-chloroacrylate and methyl 2-cyanoacrylate there are obtained the corresponding copolymers thereof with the dimethacrylate of 1-diethanolaminomethyl-3-methyl-3-phospholene-1-oxide.

EXAMPLE 5

Using the procedures described in Example 1, but replacing the methacryloyl chloride there used by acryloyl chloride, 2-chloroacryloyl chloride and 2-cyanoacryloyl chloride there are obtained the diacrylate, di-(2-chloroacrylate) and di(2-cyanoacrylate), respectively, of 1-diethanolaminomethyl-3-methyl-3-phospholene-1-oxide. These monomers can be polymerized using the procedure described in Example 1, part B, or copolymerized with methyl methacrylate using the procedure described in Example 2.

EXAMPLE 6

A mixture of 3.619 g. of the copolymer prepared as described in Example 2 and a solution of 30.5 g. of phenyl isocyanate in 100 ml. of n-hexane was heated under reflux for 9.25 hours. At the end of this time the solid catalyst was removed by filtration and the filtrate was evaporated to dryness to yield diphenyl carbodiimide. An infrared spectrum of the product revealed only a trace of unreacted isocyanate. In contrast, a solution of phenyl isocyanate in n-hexane, heated under reflux for the same length of time but in the absence of catalyst, showed no significant amount of absorption corresponding to carbodiimide linkages in the infrared spectrum.

I claim:

1. In a process for the preparation of a carbodiimide by heating the appropriate organic isocyanate in the presence of a catalyst, the improvement which comprises employing as said catalyst a polymer selected from the class consisting of (i) homopolymer of compounds of the formula

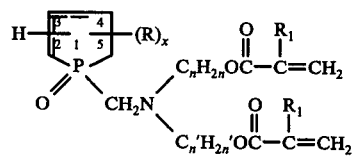

wherein the broken lines in the phospholene nucleus indicate a double bond located between the carbon atom at position 3 and one of the carbon atoms at positions 2 and 4, the H atom is attached to whichever carbon atom at positions 2 and 4 is not part of said double bond, R is selected from the group consisting of halogen, lower-alkoxy, phenoxy, hydrocarbyl from 1 to 18 carbon atoms, inclusive, and halohydrocarbyl from 1 to 18 carbon atoms, inclusive, $x$ is 0 to 3, $C_nH_{2n}$ and $C_{n'}H_{2n'}$ are each independently alkylene from 2 to 6 carbon atoms, and $R_1$ is selected from the class consisting of hydrogen, methyl, halo and cyano and (ii) copolymers of the compounds of the above formula with at least one acrylate selected from the class consisting of the lower-alkyl esters of acrylic, methacrylic, 2-haloacrylic and 2-cyanoacrylic acids.

2. A process according to claim 1 wherein said catalyst is the copolymer of methyl methacrylate and the dimethacrylate of 1-(diethanolaminomethyl)-3-methyl-3-phospholene-1-oxide.

* * * * *

UNITED STATES PATENT OFFICE
CERTIFICATE OF CORRECTION

Patent No. 4,105,643   Dated August 8, 1978

Inventor(s) Curtis P. Smith

It is certified that error appears in the above-identified patent and that said Letters Patent are hereby corrected as shown below:

Column 1, line 40:   Should read:

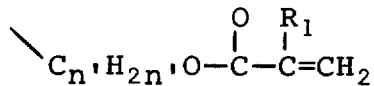   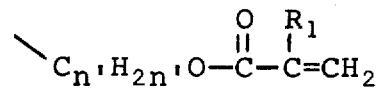

Signed and Sealed this

Twenty-seventh Day of February 1979

[SEAL]

Attest:

RUTH C. MASON
Attesting Officer

DONALD W. BANNER
Commissioner of Patents and Trademarks